US010766603B2

(12) United States Patent
Tajan et al.

(10) Patent No.: US 10,766,603 B2
(45) Date of Patent: Sep. 8, 2020

(54) PITCH-CHANGE SYSTEM EQUIPPED WITH MEANS FOR ADJUSTING BLADE PITCH AND CORRESPONDING TURBINE ENGINE

(71) Applicant: SAFRAN AIRCRAFT ENGINES, Paris (FR)

(72) Inventors: Sébastien Emile Philippe Tajan, Sucy en Brie (FR); Régis Eugène Henri Servant, Vigneux sur Seine (FR); Dominique Gerhardt Mayhew, Brie Comte Robert (FR); Eddy Keomorakott Souryavongsa, Lagny sur Marne (FR); Xavier Bertrand Miqueu, La Brede (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 49 days.

(21) Appl. No.: 15/673,078

(22) Filed: Aug. 9, 2017

(65) Prior Publication Data
US 2018/0043989 A1  Feb. 15, 2018

(30) Foreign Application Priority Data

Aug. 10, 2016  (FR) ..................... 16 57685

(51) Int. Cl.
*B64C 11/32* (2006.01)
*B64C 11/30* (2006.01)
*B64D 27/10* (2006.01)

(52) U.S. Cl.
CPC ............ *B64C 11/32* (2013.01); *B64C 11/306* (2013.01); *B64D 27/10* (2013.01); *Y02T 50/66* (2013.01)

(58) Field of Classification Search
CPC . B64D 2027/005; B64C 11/30; B64C 11/308; B64C 11/385; B64C 11/42;
(Continued)

(56) References Cited

U.S. PATENT DOCUMENTS 1,990,814 A   2/1935  Castro
3,738,869 A * 6/1973  Zaleski .................. H01M 4/02
                                                         429/128
(Continued)

FOREIGN PATENT DOCUMENTS

FR    2 973 333 A1   10/2012
GB      578570 A      7/1946

OTHER PUBLICATIONS

Easy-Install Black-Oxide Steel Slotted Washer McMaster-Carr 2014.*
(Continued)

*Primary Examiner* — Carl C Staubach
(74) *Attorney, Agent, or Firm* — Christensen O'Connor Johnson Kindness PLLC

(57) ABSTRACT

A system changes the pitch of blades of a turbine engine propeller having a plurality of blades. The system includes a plurality of links, each link being connected to one of the propeller blades at a first interface, and a control means acting on the link and having a body movable in translation along a longitudinal axis. A load transfer module is arranged between the links and the control means and is connected to the links at a plurality of second interfaces. A first adjustment element is configured to adjust an axial position of the second interfaces along the axis to provide adjustment of the pitch of all of the blades simultaneously. A plurality of second adjustment elements are configured to adjust an axial distance between each first interface and the corresponding second interface to allow the pitch of each blade to be adjusted individually.

17 Claims, 4 Drawing Sheets

(58) Field of Classification Search
CPC . F01D 7/00; F02C 3/067; F02K 3/072; F05D 2220/324; F05D 2220/325; F05D 2260/70
See application file for complete search history.

(56) References Cited

U.S. PATENT DOCUMENTS

| | | | | |
|---|---|---|---|---|
| 3,781,131 A | * | 12/1973 | McMurtry | F01D 7/00 416/155 |
| 3,893,789 A | * | 7/1975 | Andrews | F01D 7/00 415/129 |
| 4,049,363 A | * | 9/1977 | Baumann | F04D 29/362 416/157 B |
| 5,263,898 A | * | 11/1993 | Elston, III | B64C 11/06 416/129 |
| 5,319,844 A | * | 6/1994 | Huang | H02K 1/06 29/598 |
| 6,206,768 B1 | * | 3/2001 | Quek | B24B 37/32 451/285 |
| 2014/0017086 A1 | | 1/2014 | Charier et al. | |
| 2014/0064914 A1 | * | 3/2014 | Arnold | B64C 27/54 415/1 |
| 2014/0294585 A1 | * | 10/2014 | Escure | B64C 11/385 416/147 |

OTHER PUBLICATIONS

Search Report of the United Kingdom Intellectual Property Office completed Jan. 10, 2018, in corresponding Great Britain Application No. GB1712769.7, dated Aug. 9, 2017, 3 pages.
Preliminary Search Report and Written Opinion of the Institut National de la Propriété Industrielle completed Apr. 27, 2017, in corresponding French Application No. 1657685, dated Aug. 10, 2016, 8 pages.

* cited by examiner

PITCH-CHANGE SYSTEM EQUIPPED WITH MEANS FOR ADJUSTING BLADE PITCH AND CORRESPONDING TURBINE ENGINE

BACKGROUND

The present invention relates to the field of aeronautic propulsion. It concerns a system for changing the pitch of the blades of a propeller driven by a turbine engine and in particular means for adjusting the pitch of the blades. It also concerns a turbine engine equipped with a pitch-change system of this kind.

Pitch change or variable setting of the blade pitches of a turbine engine propeller is one of the ways of improving the performance and efficiency of turbine engines in different flight conditions.

Turbine engines such as turboprop engines having propulsion propellers that are for example contra-rotating are known, designated in English by the terms "open rotor" and "unducted fan", meaning an engine having an unducted fan equipped with these pitch-change systems. Turboprop engines differ from turbojet engines in that they use a propeller outside the nacelle (unducted) instead of an internal fan. The pitch-change system may also be applied to a turboprop having a single propulsion propeller or it may be equally compatible with more than one propeller.

In an open-rotor turboprop engine such as that shown in FIG. 1, a gas generator portion and a propulsion portion are aligned and arranged in a fixed cylindrical nacelle 2 carried by the structure of the aircraft. The gas generator portion is arranged downstream of the propulsion portion. Of course, the gas generator portion may be arranged in front of the propulsion portion. The gas generator portion comprises, from upstream to downstream, a set of compressors 3, a combustion chamber 4 and a set of turbines 5. A jet nozzle 8 is arranged downstream of the gas generator. The set of compressors 3 may comprise two compressors, as shown in FIG. 1, or a single compressor, typically having multiple stages depending on the chosen architecture of the gas generator. The set of turbines 5 may comprise a high-pressure turbine and a low-pressure turbine as in the case of FIG. 1 or, in a variant not shown, a single turbine typically having multiple stages. The propulsion portion has a pair of coaxial contra-rotating propellers 6, 7, upstream and downstream respectively, which are driven in inverse rotation to one another by the low-pressure turbine of the set of turbines 5 via a mechanical transmission device 17. This mechanical transmission device 17, which is represented simply by a diagram, comprises, for example, an epicyclic reduction gearbox. The propellers 6, 7 extend substantially radially in relation to the transmission shaft outside the nacelle 2.

Generally, each propeller 6, 7 comprises a substantially cylindrical rotary casing 9 carrying a hub having an outer polygonal ring 10 received in a rotary manner around the longitudinal axis X of the turbine engine in the fixed nacelle 2. The hub has radial cylindrical compartments 11 distributed on its periphery around the longitudinal axis. Shafts having radial axes, in this instance perpendicular to the longitudinal axis of the turbine engine, rigidly connected to the roots 13 of the blades 14, are received in the compartments 11 of the polygonal ring and also traverse radial passages 30 of the rotary casing.

Propeller pitch-change systems are known from documents GB-A-578570, U.S. Pat. No. 1,990,814, and FR-A1-2973333.

An example of a system for changing the pitch of each propeller is also known from document WO2013/050704. In FIG. 2, this system 23A for changing the pitch of each propeller is installed in the core of the rotating portions of a turbine engine, such as that shown in FIG. 1, comprising, for example, a control cylinder 25A for driving the blade roots in rotation. The annular control cylinder 25A comprises a cylinder 27A mounted on a fixed casing 13A and a piston 29A connected to a link mechanism 26A which is connected to each shaft 47A having a radial axis. The cylindrical rotary casing 11A rotates about the fixed casing 13A. For this purpose, at least one bearing 12A is arranged between the fixed casing 13A and the rotary casing 11A. The displacement of the movable piston 29A as a consequence of the fluidic control of the control cylinder 25A produces the desired angular pivoting of the blades by the link mechanism 26A by causing the radial shafts 47A connected to the blades to pivot. The radial shafts 47A transform the force generated by the control cylinder 25A into a torque directly on the propeller module.

However, the pitch-change system requires the integration of multiple diverse parts consisting of transforming a power arriving from the fixed portion into a movement on the rotating portion of the turbine engine. In particular, these parts form part of multiple kinematic sub-assemblies which must be placed in a certain position relative to one another and so that they operate in accordance with their preset operating parameters. The manufacturing tolerances of each part lead to problems in positioning the parts and plays, in particular axial plays, between the parts and the sub-assemblies. These manufacturing tolerances and plays affect the stroke of the control cylinder and in particular the setting of the blades. The setting of the blades may therefore be different on all the blades in a single propeller with a difference that is generally of the order of 0.5° relative to the expected setting. These problems of setting produce forces and vibrations that are detrimental to the operation and performance of the turbine engine.

The aim of the present invention is, in particular, to provide a pitch-change system that has a setting that is identical and true to the reference value across all the blades while being simple to manufacture, saving time during fitting, and taking into account the difficulties of integration into a congested environment.

SUMMARY

This objective can be achieved, in accordance with the invention, by virtue of a system for changing the blade pitch of at least one turbine engine propeller provided with a plurality of blades, the system comprising:

a link mechanism connected to the propeller blades at a first interface;

a control means acting on the link mechanism and comprising a movable body movable translatable along a longitudinal axis relative to a fixed body; and a load transfer module arranged between the link mechanism and the control means, the load transfer module being connected to the link mechanism at a second interface;

the pitch-change system comprising means for adjusting the setting of the blades comprising, firstly, first adjustment elements arranged between the load transfer module and the movable body and configured so as to adjust an axial position of the second interface along the longitudinal axis and, secondly, second adjustment elements configured so as to adjust an axial distance along the longitudinal axis between the first interface and the second interface.

Thus, this solution allows the objective stated above to be achieved. A configuration of this kind simplifies the execution of a common and relative adjustment of defects in the setting or pitch of the blades that are attributable to the manufacturing tolerances of the parts and the axial plays between said parts. In particular, the adjustment means allow, firstly, all the blades to have the same setting via the first adjustment elements which allow a common or absolute adjustment, and, secondly, they allow a non-compliant and/or non-identical setting of one or more than one of the blades to be adjusted via the second setting elements. The first setting elements arranged between the load transfer module and the control means allow the setting of all the blades to be assigned in an absolute manner. In this way, warping of the link mechanism and an operation on each blade that would involve a loss of time and a complex adjustment range are avoided. By acting on the axial distance separating the first and second interfaces, the second adjustment elements allow a setting of the blades relative to one another that takes account of the first common adjustment.

According to another feature of the invention, the first adjustment elements comprise a removable annular shim of a predetermined length along the longitudinal axis dependent on an expected displacement of the link mechanism relative to an axial reference position of the movable body. A shim of this kind is simple in design, easy to fit and does not make the integration of the pitch-change system more complex. In particular, the shim of predetermined length compensates for the axial play and the manufacturing tolerances between the pitch-change module and the control means. Thus, all that is necessary is to select the shim of appropriate length depending on the expected displacement, taking into account a possible difference depending on the axial reference position.

According to another feature of the invention, the adjustment means comprise an annular shim of a predetermined length dependent on a difference between a setting value measured at an interface of the blades and a reference setting value of the blades at a given axial reference position of the movable body of the control means.

According to another feature of the invention, the blades are each connected to a radial shaft at the interface of the blades formed by splines arranged at a radial end of each radial shaft and positioned in complementary grooves in the roots of the blades.

Advantageously, the shim comprises an angular slot. The fact that the shim has a slot facilitates its fitting relative to the control means which comprises a number of auxiliary systems. In this way, modification of the parts of the system is avoided.

According to another feature of the invention, the load transfer module comprises a load transfer bearing fitted between an inner collar rigidly connected to the movable body and an annular outer collar connected to the link mechanism.

According to another feature of the invention, the inner collar comprises an annular flange extending along a radial axis perpendicular to the longitudinal axis and being rigidly connected to a downstream wall of the movable body, the annular shim being arranged between the downstream wall and the annular flange. Thus, this annular flange facilitates the placement of the shim which, in accordance with its length, allows the axial position of the second interface to be adjusted and corrected.

According to another feature of the invention, the link mechanism comprises links each connected firstly to a radial shaft rigidly connected to the blade roots via the first interface, and secondly to the outer collar of the load transfer module via the second interface.

According to another feature of the invention, the links are links of variable length forming the second adjustment elements, each link comprising a first portion and a second portion connected to one another by connection means configured so as to adjust the length of the link along an axis parallel to the longitudinal axis. A configuration of this kind is simple and allows the pitch setting of each blade to be adjusted individually and independently. Furthermore, these links allow the movement and the axial force of the control means to be transmitted to each shaft connected to the propeller blades.

Advantageously, but in a non-limiting manner, the connection means comprise a threaded rod screwed at each of its ends into a tapped hole in the first and second portions.

According to another feature of the invention, the connection means comprise a device for preventing rotation of the threaded rod relative to the tapped hole in the first and second portions. In this way, the tightening of the threaded rod relative to the first and second link portions is ensured in this congested environment in which an oil chamber is provided. The use of conventional means such as lock wire on the thread of the threaded rod would lead to the risks of debris and of the ingress of this debris into the oil chamber, which would adversely affect the lifespan of the bearings.

According to a feature of the invention, the anti-rotation device comprises a first nut and a second nut each provided with a cylindrical wall and fitted to each end of the threaded rod, respectively, and an anti-rotation element arranged between a cylindrical wall and a wall of the first and second link portions. An arrangement of this kind prevents the nuts from being lost in the oil chamber.

Advantageously, but not restrictively, the control means comprises an actuator, the movable body of which slides around the cylindrical wall of a fixed casing. In particular, the actuator comprises an annular control cylinder.

The invention also relates to a turbine engine comprising at least one propeller provided with a plurality of variable-pitch blades and at least one pitch-change system as specified above, the link mechanism of said system being connected to the blades of the propeller.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
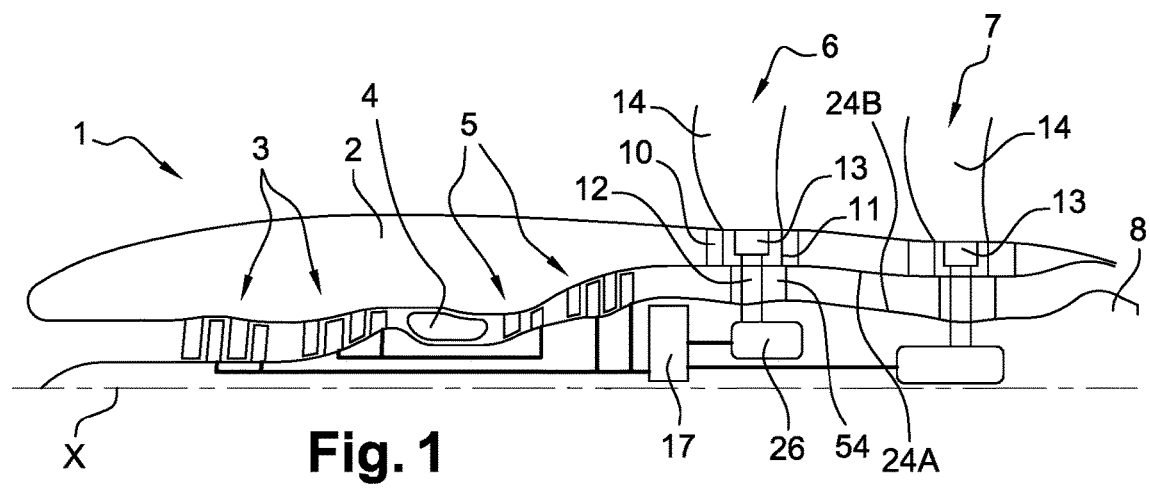
FIG. 1 is a schematic representation in axial cross section of an example of a turbine engine having a system according to the invention for changing the pitch of the blades of a propeller.
Figure 2:
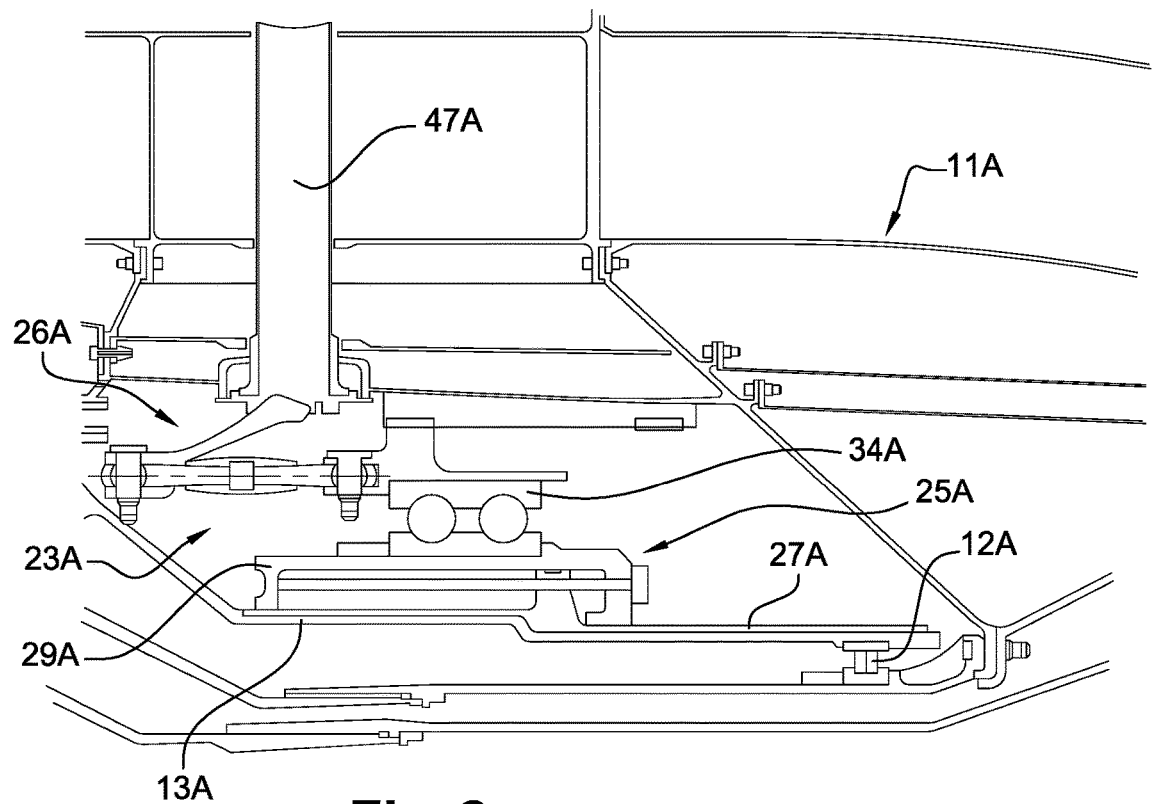
FIG. 2 is an example of a system for changing the pitch of the blades of a propeller, according to an example of the prior art.

FIG. 1 and the next part of the description represent an unducted-fan turboprop engine intended to be fitted to an aircraft. However, the invention may be applied to other types of turbine engine. The corresponding reference numbers of the elements of this turbine engine described above are retained in the description that follows.

According to the configuration of this turbine engine, the flow of air entering the turbine engine is compressed in the set of compressors 3, then mixed with fuel and burned in the combustion chamber 4. The combustion gases produced then pass into the turbines 5 in order to drive in contra-rotation, via the mechanical transmission device 17, the propellers 6, 7 that provide the greater part of the thrust. The mechanical transmission device 17 may comprise a differential reducer or a gearbox having epicyclic gear trains. It is of course possible to drive the upstream propeller 6 and the downstream propeller 7 directly by means of one of the turbines, in this instance the low-pressure turbine. The combustion gases are expelled through the jet nozzle 8, contributing to the thrust of the turbine engine 1. The gases pass through a gas flow duct extending substantially axially in the turbine engine between a radially inner skin 24A and a radially outer skin 24B. In the present invention, and in general, the terms "upstream" and "downstream" are defined in relation to the circulation of the gases in the turbine engine.

Figure 3:
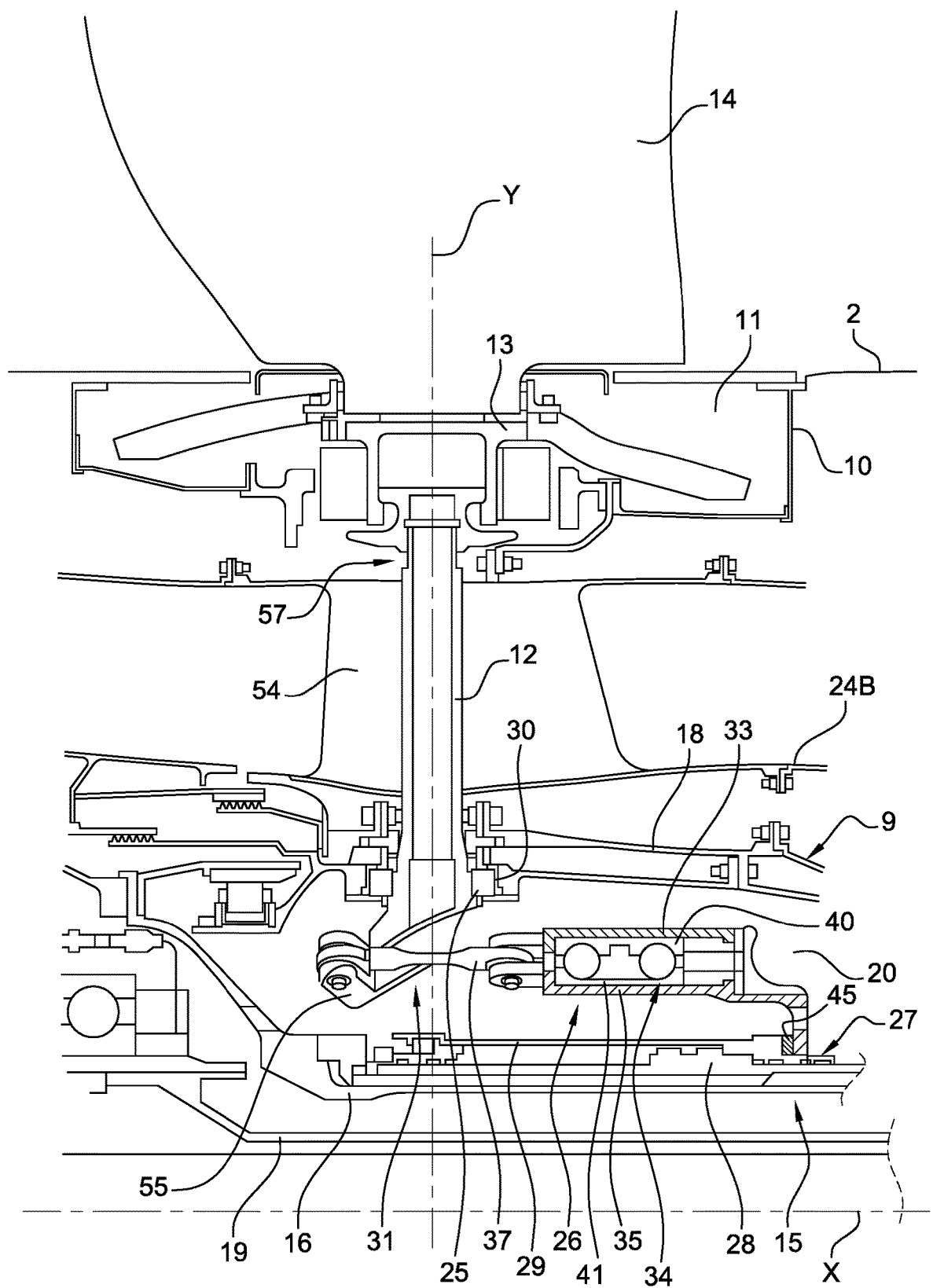
FIG. 3 is a view in axial cross section schematically showing in greater detail elements of a pitch-change system that are connected to a blade of a propeller according to the invention.

FIG. 3 shows a propeller module of this turbine engine 1. The turbine engine comprises a generally cylindrical rotary casing 9 extending around a longitudinal axis X. The casing 9 is fitted rotatably in the nacelle 2 around the axis X. The casing 9 is also connected to a corresponding portion of the mechanical transmission device 17.

This rotary casing 9 or rotor casing comprises multiple skins or revolution walls including at least one outer wall 18 and one inner wall 19 relative to a radial axis Y perpendicular to the longitudinal axis X. In the remainder of the description, the words "upper" and "lower" are defined in relation to the radial axis Y according to the distance relative to the longitudinal axis X. The inner wall 18 and the outer wall 19 form an annular space 20.

The casing 9 comprises radial compartments 11 and radial passages 30 which are coaxial and which are each traversed by a shaft 12 having a radial axis Y, hereinafter referred to as a radial shaft 12. Each radial shaft 12 is connected to a root 13 of a blade 14 of the corresponding propeller. The blades 14 extend radially outside the nacelle 2. In particular, the casing 9 comprises a polygonal ring 10, provided with compartments 11, in this instance cylindrical, distributed regularly on its periphery. The compartments 11 receive the roots 13 of the blades 14. As for the outer wall 18, this comprises the passages 30, in this instance cylindrical, distributed regularly on its periphery.

The shafts 12 each extend in particular radially through a structural arm 54 connecting the polygonal ring 10 to a portion of the radially inner skin 24A in which the outer wall 18 extends. The shafts 12 pivot about the axis Y in the radial passages 30 and radial compartments 11. For this purpose, each radial shaft 12 is held in a corresponding passage 30 by means of a guide bearing 25 (FIG. 3) arranged in the casing 9. To ensure the rotation of the casing 9 relative to the longitudinal axis X, the housing 9 is supported directly by anti-friction bearings on a fixed cylindrical casing 15 or stator casing. The fixed casing 15 and the rotary casing 9 are coaxial. The fixed casing 15 also has multiple revolution walls. In particular, the fixed casing 15 comprises a wall 16, in this instance cylindrical, having a circular cross section. The cylindrical wall 16 extends axially between the inner wall 19 and the outer wall 18 of the rotary casing 9.

The turbine engine comprises a system 26 for changing the pitch of the blades 14 of the propeller 6, allowing the setting or the pitch of the blades 14 around their radial axes Y to be made to vary so that they occupy angular positions in accordance with the operating conditions of the turbine engine and the flight phases concerned. The pitch-change system 26 is arranged in the annular space 20. More specifically, this pitch-change system 26 is arranged between the cylindrical wall 16 of the fixed casing 15 and the outer wall 18 of the casing 9.

Figure 4:
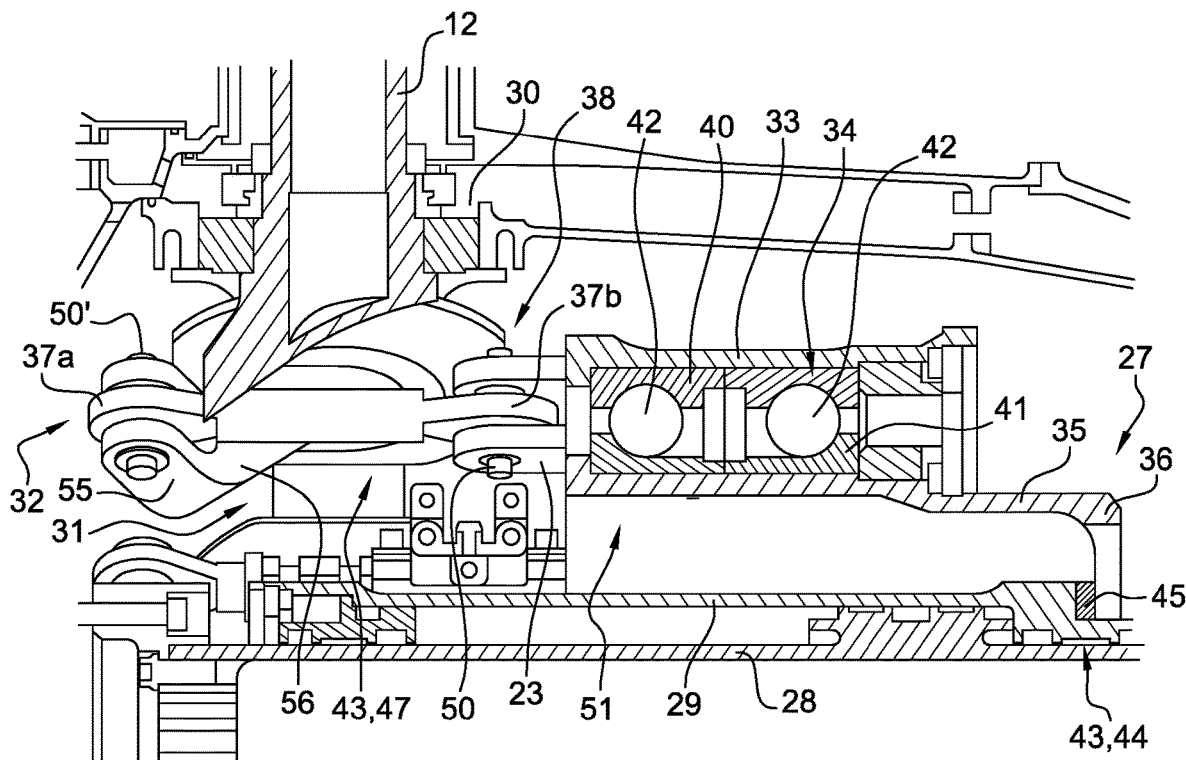
FIG. 4 is a detailed view in axial cross section of an example of a pitch-change system having means for adjusting the setting of the blades according to the invention.

In order to allow the setting, as shown in FIGS. 3 and 4, the system 26 comprises a control means 27 controlling the change in pitch of each of the blades 14 and a link mechanism 31 connecting the control means 27 to the roots 13 of the blades 14. The link mechanism 31 is connected to the radial shafts 12 at a first interface 32 described later in the description. The control means 27 is arranged so as to move the link mechanism 31 substantially axially along the axis X in such a way that the axial movement of the link mechanism 31 leads to pivoting of the radial shafts 12.

The control means 27 comprises a fixed body 28 and a movable body 29 moving in translation relative to the fixed body 28 along the axis X. The movable body 29 is arranged around the fixed body 28 and is coaxial with the axis X. The movable body 29 moves only in translation. Said body 29 is immobilised in rotation relative to the fixed body by means of an anti-rotation means (not shown) fixed to the fixed body 28 and to the movable body 29. The fixed body 28 is cylindrical and has a circular cross section and surrounds the wall 16 of the fixed casing 15. The fixed body 28 is also fitted integrally with the wall 16 so as to be immobilised in rotation and in translation relative to the fixed casing 15. The control means 27 is mounted on the fixed casing 15. That is to say that it is separate from the fixed casing 15 and does not constitute a structural element forming part of the fixed casing 15.

In the present invention, the control means 27 comprises an actuator. This actuator advantageously comprises an annular cylinder consisting of its rod, which is movable in relation to a fixed cylinder that is rigidly connected to the fixed casing 15. The movable rod is formed by the movable body 29 while the fixed cylinder is formed by the fixed body 28.

Figure 5:
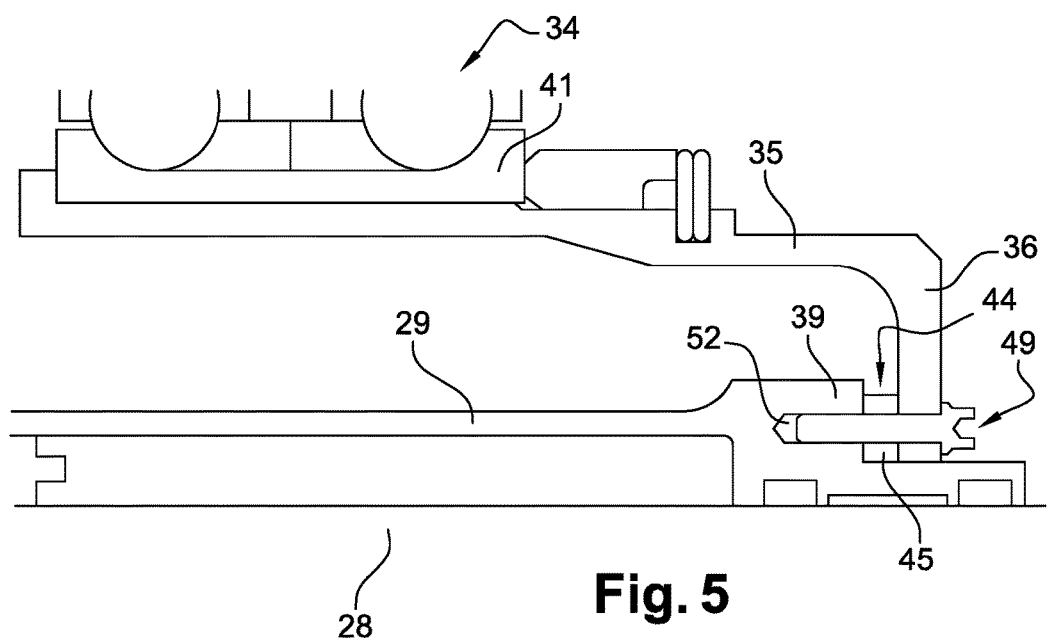
FIG. 5 is a detailed view in axial cross section of an example of means for adjusting the setting according to the invention.

The pitch-change system 26 comprises a load transfer module 51 shown in more detail in FIG. 4. The load transfer module 51 is equipped with a load transfer bearing 34 and is arranged between the link mechanism 31 and the actuator 27. In particular, the module 51 is arranged between the link mechanism 31 and the movable body 29 so as to transmit the axial forces exerted by the movable body 29. The module 51 is connected to the link mechanism 31 by a second interface 38 described later in the description. In other words, the link mechanism 31 is connected firstly to the radial shaft 12 via the first interface 32, and secondly to the module 51 via the second interface 38. For this purpose, the module 51 comprises an annular outer collar 33 and an annular inner collar 35. The outer collar 33 is connected to the link mechanism 31 whereas the inner collar 35 is rigidly connected to the movable body 29. To that end, the inner collar 35 comprises an annular flange 36 extending along the radial axis Y. The flange 36 is fixed at a downstream radial wall 39 of the movable body 29 via fixing means 49. These fixing means 49 are, for example, screws as shown in FIG. 5.

The bearing 34 comprises an outer ring 40 rigidly connected to the collar 33 and an inner ring 41 rigidly connected to the collar 35. The bearing 34 is in this instance formed by a double-row ball bearing 42, the balls of which may be of the angular contact type oriented in opposite directions so as to optimise the transmission of the axial forces.

As for the link mechanism 31, this comprises a set of articulated links 37 that are distributed regularly around the control means 27 and which are intended to act on the roots 13 of the blades 14. There are as many links 37 as there are blades.

The second interface 38 is formed by a clevis 23 rigidly connected to the outer collar 33 of the module 51. The clevis 23 carries an articulation shaft 50 that traverses the clevis along an axis parallel to the axis Y. The first interface 32 is formed by a journal 55 rigidly connected to a lower radial end 56 of the radial shaft 12. The journal 55 also carries an articulation shaft 50' traversing the journal along an axis that is substantially transverse in relation to the axis Y. An upper radial end 57 of the radial shaft 12, which can be seen in FIG. 3, is connected to the root 13 of the blades for conjoint rotation therewith at the compartment 11. The upper radial end 57 of each shaft 12 comprises splines distributed regularly over an outer surface of the wall of the shaft 12 around the radial axis Y and extending in a direction parallel to the radial axis Y. The splines are positioned in complementary grooves of the roots 13 of the blades 14 forming the interface of the blades so as to guide the blades in rotation when the shafts 12 pivot.

With reference to FIGS. 4 to 7, the pitch-change system 26 comprises means 43 for adjusting the setting of the blades. These adjustment means 43 have first elements 44 for absolute adjustment of the setting, allowing all the blades to have the same setting for a given command, and second elements 47 for relative adjustment that are configured to adjust the setting of the blades individually and independently.

Figure 6:
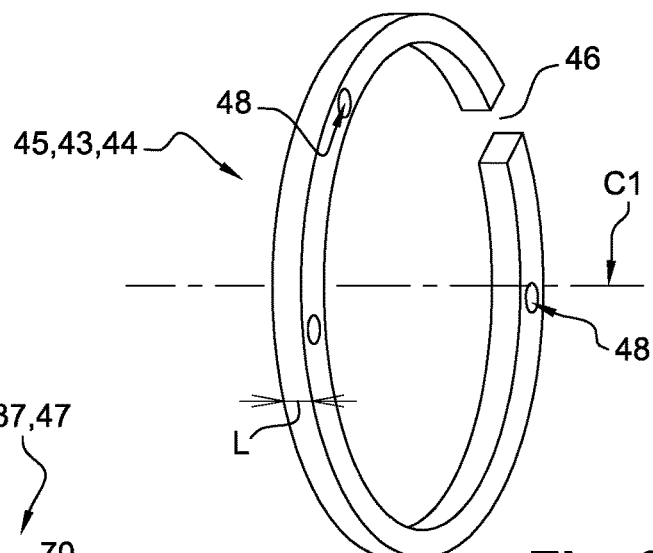
FIG. 6 is an illustration of an embodiment of first elements for adjusting the setting of the blades.

In FIGS. 4 to 6, the first adjustment elements 44 are arranged between a first kinematic sub-assembly exerting a force and a second kinematic sub-assembly transmitting said force. In the present application, the module 51 and the link mechanism 31 form the second kinematic sub-assembly and the actuator 27 forms the first kinematic sub-assembly. Thus, the first adjustment elements 44 can move and transmit the forces from the first sub-assembly towards the second sub-assembly. In particular, the first adjustment elements are removably arranged between the actuator 27 and the module 51. The first elements 44 have a removable annular adjustment shim 45. In FIG. 6, the shim 45 has a wall of predetermined length L extending along an axis C1 parallel to the longitudinal axis X. This shim 45 is provided with an angular slot 46. In other words, the shim 45 is open so as to facilitate its integration around the actuator 27. As is shown in FIG. 6, the shim 45 is arranged between the downstream radial wall 39 of the movable body 29 and the annular flange 36 of the inner collar 35 of the module 51. The shim 45 also comprises openings 48 traversing the wall thereof on either side along the axis C1. Certain openings allow the passage of auxiliary systems for the operation of the actuator and in particular the means to prevent rotation of the movable body 29. Other openings 48 are traversed by the fixing means 49. These fixing means 49 are mounted on the flange 36 of the annular collar 35 and fit into tapped bores 52 of the movable body 29. The axes of the tapped bores 52 are coaxial with those of the openings 48.

Advantageously, the shim 45 is made of a metal material included in a group consisting of a titanium-based alloy, a steel, a stainless steel, and an inconel-type nickel-based alloy or superalloy. In particular, these materials allow the shim to resist high temperatures. In addition, these materials are compatible with the materials of the actuator.

The shim 45 is positioned once the actuator and then its auxiliary systems have been fitted. The predetermined length of the shim 45 is dependent on an expected displacement of the link mechanism relative to an axial reference position of the movable body 29. In other words, in accordance with an axial reference position of the movable body 29 relative to the axis X, the setting of the blades should correspond to a given reference value for the setting. These axial reference positions and reference setting value are recorded in a memory of the pitch-change system or in an information-processing system of the turbine engine. The setting of the blades is measured at the splines of the radial shafts 12. In particular, where the setting value measured at the interface of the blades is less than or greater than the reference setting value at the axial reference position of the movable body, it is then necessary to set all the blades. The difference between the reference setting value at an axial reference position and the setting value measured at an axial position after fitting makes it possible to determine the length of the shim to be arranged.

Preferably, the shim 45 is made of a magnetic material allowing it to be rectified at the time of fitting.

Figure 7:
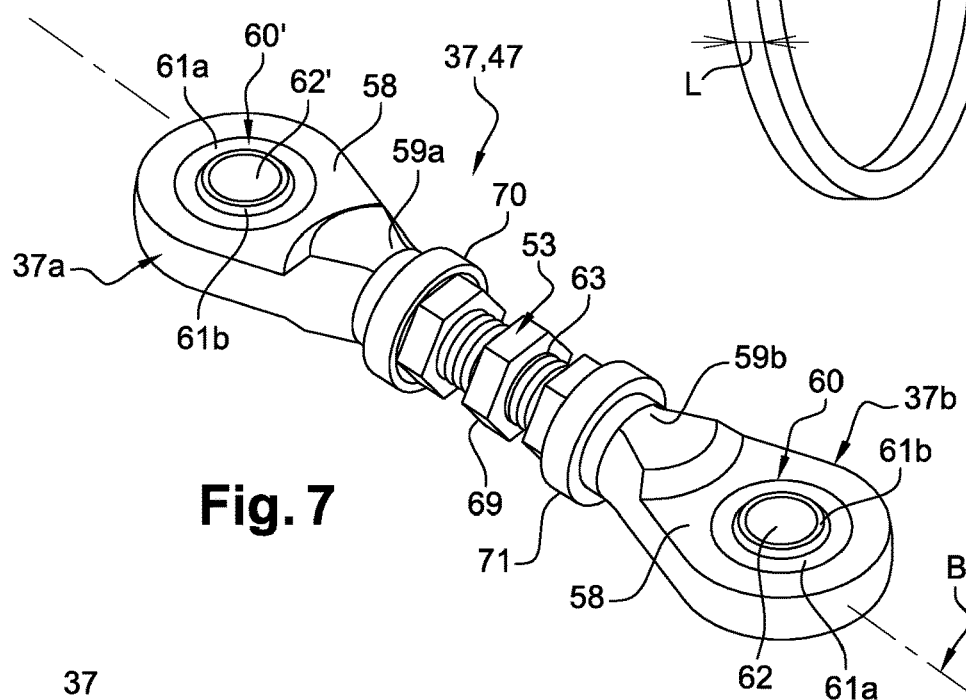
FIG. 7 is a view in axial cross section of an example of a link in a link mechanism forming second elements for adjusting the setting according to the invention.
Figure 8:
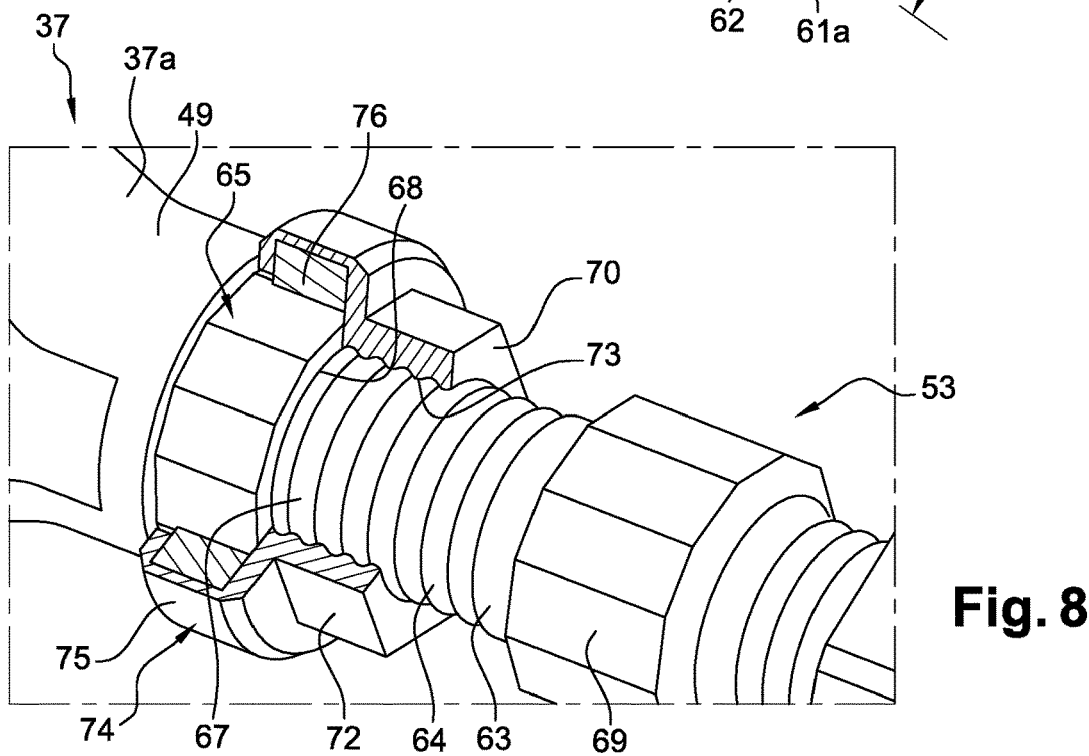
FIG. 8 is a detailed partial perspective view of the arrangement of an example of the means for connecting to a link portion according to the invention.

With reference to FIGS. 7 and 8, the means 43 for adjusting the setting comprise second elements 47 for relative adjustment so that the adjustment of the setting is performed at a single blade, that is to say, individually. The second elements 47 are formed by the links 37 which in this instance are of variable length. The length of the links 37 can be adjusted via connection means 53. Each link 37 is connected firstly to a radial shaft 12, and secondly to the outer collar 33 of the module 51. The links 37 each comprise a first portion 37a and a second portion 37b that extend generally along an axis B. In this instance, the axis B is parallel to the longitudinal axis X. The first and second portions each comprise a body 58a, 58b and a free end 59a, 59b, respectively. Each body 58a, 58b comprises a ball joint 60, 60'. This ball joint is formed by a first ring 61a and a second ring 61b which are accommodated in an opening traversing the body of the first and second portions, respectively, of the link 37 along an axis perpendicular to the axis B. The first ring 61a is rigidly connected to a cylindrical surface of the opening and receives the second ring 61b with which it cooperates. The second ring 61b has a cylindrical orifice 62, 62' traversing said second ring on both sides along an axis perpendicular to the axis B. In this example, the first portion 37a is connected to the journal 55 of the radial shaft 12. The articulation shaft 50' (FIG. 4) traverses the cylindrical orifice 62' of the second ring 61b. As for the second portion 37b, this is connected to the clevis 23 which is rigidly connected to the outer collar 33 of the module 51. The articulation shaft 50 (FIG. 4) traverses the cylindrical orifice 62 of the inner ring 61b. The first portion 37a and the second portion 37b are connected to one another via the connection means 53. For this purpose, the connection means 53 comprise a substantially cylindrical rod 63 extending along the axis B.

The rod 63 has an outer wall provided with an external thread 64. Each rod 63 is connected on either side to the first and second portions 37a, 37b of a link 37. In particular, the free end 59a, 59b of each of the first and second portions of the link 37 has a wall 65 that is substantially cylindrical in shape and has a tapped hole 68. The threaded rod 63 is screwed at each of its ends 67 into the tapped holes 68. To facilitate gripping and handling of the connection means 53 that allow the length of the links to be adjusted, the links have a tightening member 69 arranged on the rod 63. Preferably, but in a non-limiting manner, the tightening member 69 is formed as a single part with the rod 63. This member 69 extends radially outside the rod 63 relative to the axis B. In this example, the member 69 is the shape of a nut. However, another shape allowing gripping and handling of the connection means 53 can be considered. Thus, by screwing the threaded rod 63 more or less into the tapped holes 68 of the first and second portions 37a, 37b of a link 37, the setting error of the corresponding blade 14 is adjusted. The pitch of the thread 64 of the rod 63 and of the tapped holes 68 must be sufficiently precise so as to allow said adjustment while being long enough to compensate for the sum of all the tolerances. The adjustment of the length of the links makes it possible to finish the common adjustment determined via the shim 45.

With reference to FIG. 8, the connection means 53 also comprise an anti-rotation device intended to prevent the first and second portions 37a, 37b of the links from becoming unscrewed relative to the threaded rod 63. In particular, the anti-rotation device comprises at each end 67 of the rod 63, a first nut 70 and a second nut 71 (cf. FIG. 7). The first and second nuts 70, 71 each comprise a main body 72 having an internal tapping 73. The internal tapping 73 cooperates in a complementary manner with the external thread 64 of the rod 63. The first and second nuts 70, 71 also have an enlarged base 74 of substantially cylindrical shape. Each base 74 is joined respectively to the body 72 of the first and second nuts. In particular, the base 74 comprises a cylindrical wall 75 extending along the axis B. The anti-rotation device further comprises rotational locking elements 76 that are arranged, for each link portion, between the wall 65 of the corresponding link portion 37a, 37b and the cylindrical wall 75 of the base 74 of the first and second nuts.

While illustrative embodiments have been illustrated and described, it will be appreciated that various changes can be made therein without departing from the spirit and scope of the invention.

The invention claimed is:

1. A pitch change system for changing the pitch of blades of at least one turbine engine propeller provided with a plurality of blades, the system comprising:
   a plurality of links, each link corresponding to one of the blades and being connected to the corresponding blade to define one of a plurality of first interfaces;
   a control means acting on each link and having a movable body and a fixed body, the movable body being translatable along a longitudinal axis relative to said fixed body and the movable body being arranged around the fixed body and being coaxial with the longitudinal axis;
   a load transfer module arranged between the plurality of links and the control means, each link being connected to the load transfer module to define one of a plurality of second interfaces; and
   means for adjusting the setting of the blades, comprising:
      a removable first adjustment element arranged between the load transfer module and the movable body and configured to adjust simultaneously an axial position of each of the plurality of second interfaces along the longitudinal axis and to adjust in a common way the plurality of blades, and
      a plurality of second adjustment elements, each second adjustment element corresponding to one of the plurality of links and being configured to adjust an axial distance along the longitudinal axis between the first and second interfaces of the corresponding link.

2. The pitch change system according to claim 1, wherein the first adjustment element comprises an annular shim of a predetermined length along the longitudinal axis dependent on an expected displacement of the links relative to an axial reference position of the movable body.

3. The pitch change system according to claim 1, wherein the first adjustment element comprises an annular shim of a predetermined length dependent on a difference between a setting value measured at an interface of the blades and a reference setting value of the blades at a given axial reference position of the movable body of the control means.

4. The pitch change system according to claim 2, wherein the shim has an angular slot.

5. The pitch change system according to claim 3, wherein each blade is connected to a corresponding radial shaft at a blade interface comprising splines arranged at a radial end of the radial shaft and positioned in complementary grooves in a root of the blade.

6. The pitch change system according to claim 1, wherein the load transfer module comprises a load transfer bearing disposed between an annular inner collar rigidly connected to the movable body and an annular outer collar connected to the plurality of links.

7. The pitch change system according to claim 6, wherein the inner collar comprises an annular flange extending along a radial axis perpendicular to the longitudinal axis and being rigidly connected to a downstream wall of the movable body, the first adjustment element comprising an annular shim arranged between the downstream wall and the annular flange.

8. The pitch change system according to claim 1, wherein the each of the links is connected firstly to a radial shaft rigidly connected to a root of the corresponding blade via the corresponding first interface, and secondly to an outer collar of the load transfer module via the corresponding second interface.

9. The pitch change system according to claim 8, wherein the links are links of variable length forming the second adjustment elements, each link comprising a first portion and a second portion connected to one another by connection means configured to adjust the length of the link along an axis parallel to the longitudinal axis.

10. The pitch change system according to claim 9, wherein the connection means comprise a threaded rod screwed at each of its ends into a tapped hole in the first and second portions.

11. The pitch change system according to claim 10, wherein the connection means comprise a device for preventing rotation of the threaded rod relative to the tapped hole in the first and second portions.

12. A turbine engine comprising at least one propeller provided with a plurality of variable-pitch blades and at least one pitch-change system, for changing the pitch of blades, the at least one pitch-change system comprising:
- a plurality of links, each link corresponding to one of the plurality of blades and being connected to the corresponding blade to define one of a plurality of first interfaces;
- a control means acting on the links and having a movable body translatable along a longitudinal axis relative to a fixed body;
- a load transfer module arranged between the links and the control means, the load transfer module being connected to each of the links to define one of a plurality of second interfaces; and
- means for adjusting the setting of the blades, comprising:
- a removable first adjustment element arranged between the load transfer module and the movable body and configured to adjust simultaneously an axial position of each of the second interfaces along the longitudinal axis and to adjust in a common way the plurality of blades, and
- second adjustment elements, each second adjustment element being configured to adjust an axial distance along the longitudinal axis between one of the plurality of first interfaces and the corresponding second interface.

13. The pitch change system according to claim 2, wherein an inner collar comprises an annular flange extending along a radial axis perpendicular to the longitudinal axis and being rigidly connected to a downstream wall of the movable body, the annular shim being arranged between the downstream wall and the annular flange.

14. The pitch change system according to claim 6, wherein the load transfer bearing is formed by a double-row ball bearing.

15. The pitch change system according to claim 1, wherein the movable body is immobilised in rotation relative to the fixed body which is fixed to a fixed casing.

16. The pitch change system according to claim 1, wherein the fixed body surrounds a wall of a fixed casing.

17. The pitch change system according to claim 1, wherein the first adjustment element comprises an annular shim having openings traversing a wall thereof on either side along an axis parallel to the longitudinal axis.

* * * * *